United States Patent [19]

Cleveland et al.

[11] 3,935,523
[45] Jan. 27, 1976

[54] NON-MINIMUM PHASE LINEAR CONTROLLER FOR HYDRAULIC MECHANISMS

[75] Inventors: Dixon Cleveland, Annandale; Milford R. Derrick, Falls Church, both of Va.

[73] Assignee: Adaptronics, Inc., McLean, Va.

[22] Filed: Apr. 22, 1974

[21] Appl. No.: 462,901

Related U.S. Application Data

[63] Continuation of Ser. No. 312,267, Dec. 5, 1972, abandoned.

[52] U.S. Cl. ............... 318/609; 318/610; 318/616; 318/618; 318/635
[51] Int. Cl.² ..................................... G05B 11/00
[58] Field of Search ........... 318/609, 610, 635, 606, 318/616–618

[56] References Cited
UNITED STATES PATENTS

| | | | |
|---|---|---|---|
| 2,946,943 | 7/1960 | Nye et al. | 318/610 X |
| 3,510,737 | 5/1970 | Brown et al. | 318/635 X |
| 3,523,193 | 8/1970 | Hutcheon | 318/609 X |
| 3,533,236 | 10/1970 | Cottington | 318/609 X |

*Primary Examiner*—James R. Scott
*Attorney, Agent, or Firm*—Jay M. Cantor

[57] ABSTRACT

The disclosure relates to a non-minimum phase linear controller which uses positive servomechanism rate feedback to control hydraulic mechanisms. The disclosure also relates to a controller comprising, in combination, a conventional linear controller and a non-minimum phase linear controller, the outputs of the combined controllers being weighted in a predetermined ratio to provide a single output control signal.

4 Claims, 6 Drawing Figures

HYDRAULIC SERVOMECHANISM BLOCK DIAGRAM

CONVENTIONAL LINEAR CONTROLLER

PURE NON-MINIMUM PHASE LINEAR CONTROLLER

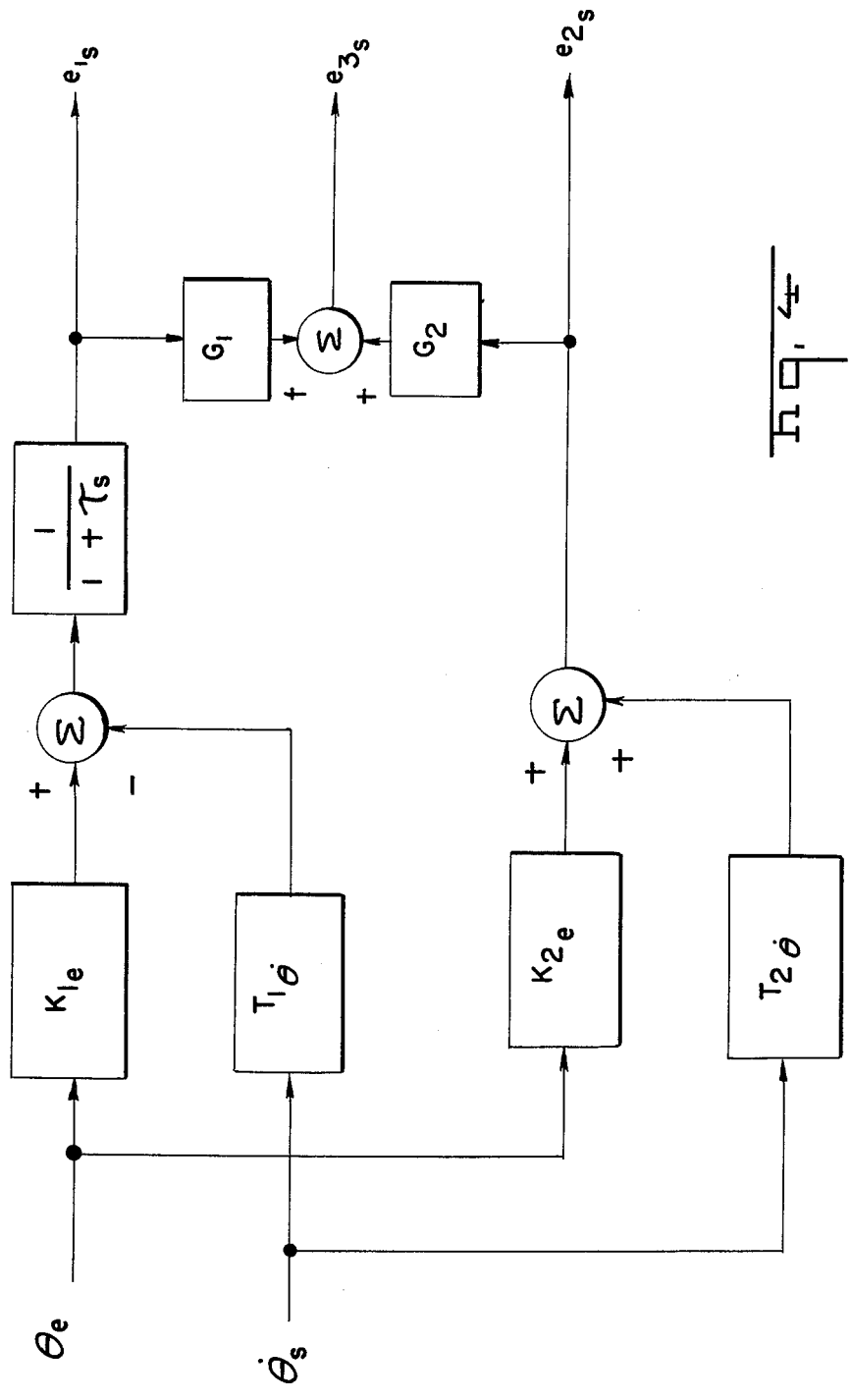

NON-MINIMUM PHASE LINEAR CONTROLLER FOR HYDRAULIC MECHANISMS

This is a continuation of application Ser. No. 312,267, filed Dec. 5, 1972, now abandoned.

This invention relates to linear controllers and, more specifically, to a non-minimum phase linear controller having positive servomechanism rate feedback.

Conventional linear controllers, generally lag-compensation devices, have been well known in the art and have performed their function adequately for most hydraulic servomechanism control applications. However, it has been found that there are two major areas where improvement is desired and often necessary over lag-compensation controllers. First the response time for the controllers is desired to be faster than that of the present lag-compensation controllers. Increased speeds with hydraulic servomechanisms will decrease the production time and therefore increase production rates, yielding more efficient production processes. The log-compensation controller can not be speeded up significantly because variations in controller parameters which would increase speed would also lead to system instability, as is well known in the art. Second, lag-compensation controllers demonstrate a small amount of overshoot. Overshoot, in metal contouring machine tools for example, is very undesirable because it takes off excessive metal.

These problems have been overcome in part by use of a pure non-minimum phase linear controller which makes use of positive servomechanism rate feedback. Though it has been generally felt by those skilled in the art, that the use of positive rate feedback would lead to system instability, this invention relates to the use of positive rate feedback such that the control system remains highly stable, such that very fast rise times are achieved, and such that there is no controller overshoot in response to step-like or high acceleration commands.

The pure non-minimum phase linear controller can be further improved in its overall response if it is combined with the conventional lag-compensation controller. With the combination, one achieves the fast rise-time and no-overshoot characteristics associated with the pure non-minimum phase linear controller and also the desirable steady-state stiffness characteristic associated with the lag-compensation controller. The combination of the two controllers is provided by reducing the amplitudes of the control signals from the conventional linear controller and the non-minimum phase controller and combining the two in a summer.

It is therefore an object of this invention to provide a controller which has fast rise time relative to prior art linear controllers.

It is a further objective of this invention to provide a controller which does not have overshoot.

It is a yet further object of this invention to provide a non-minimum phase linear controller having positive rate feedback where that positive rate feedback is indicated by right half plane zero or zeros in the S plane when the system is analyzed by the root-locus method.

It is a yet further object of this invention to combine the output of a conventional linear controller having negative rate feedback and a non-minimum phase linear controller having positive rate feedback.

It is a yet further object of this invention to combine a conventional linear controller and a non-minimum phase linear controller with the outputs thereof being combined in any predetermined ratio.

The above objects and still further objects of the invention will immediately become apparent to those skilled in the art after consideration of the following preferred embodiments thereof, which are provided by way of example and not by way of limitation wherein:

FIG. 4 is a block diagram of a combined non-minimum phase linear phase controller and lag-compensation controller in accordance with the present invention.

Figure 1:
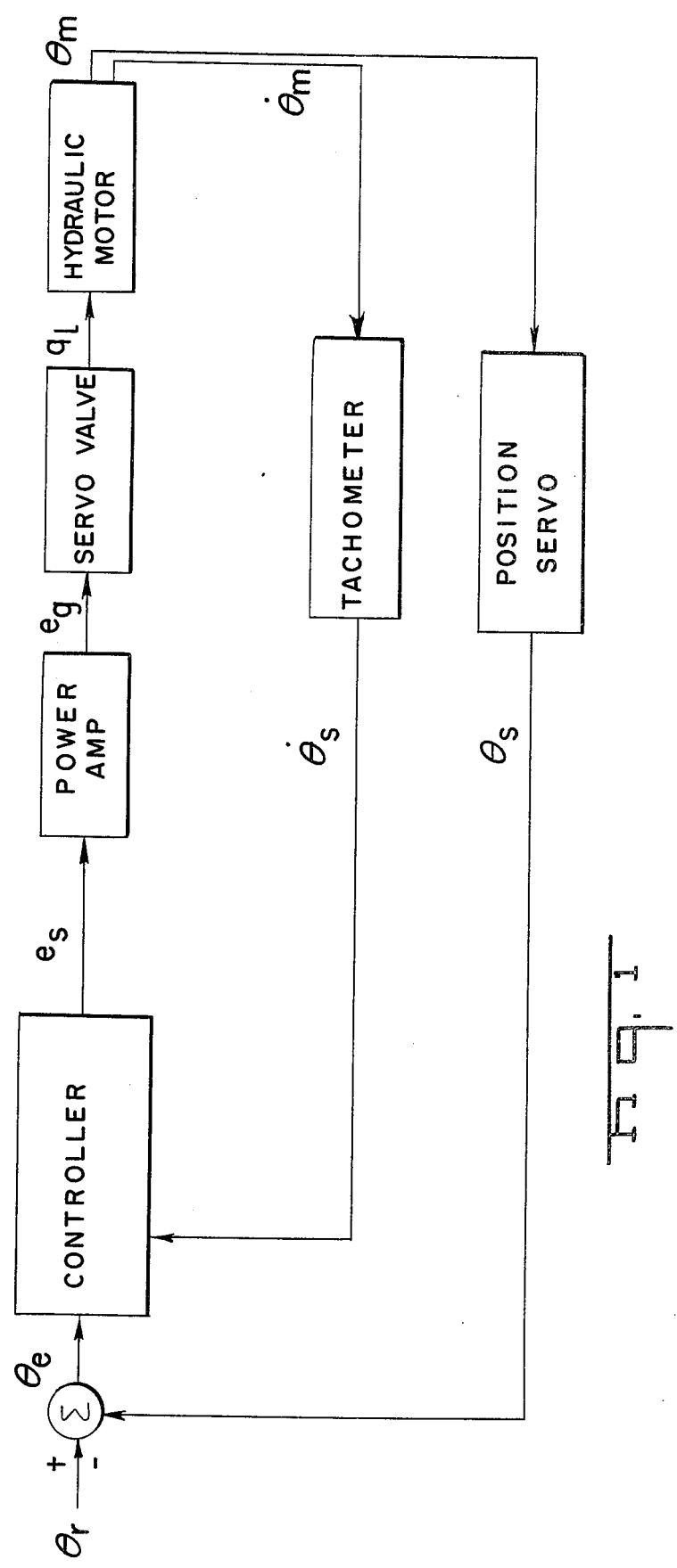
FIG. 1 is a block diagram of a hydraulic servomechanism.

Referring now to FIG. 1, there is shown a block diagram of a hydraulic servomechanism control loop. The purpose of the control loop is to drive the angular position $\theta_s$ of the hydraulic motor shaft to match a reference angular position $\theta_r$. The shaft position $\theta_s$ is measured by a position servomechamism. The angular rate $\dot{\theta}_s$ of the hydraulic motor is measured by a tachometer. $\theta_r$ and $\theta_s$ are differenced in a summer to find the hydraulic motor error $\theta_e$ which is equal to $\theta_r$ minus $\theta_s$ $$\theta_e = \theta_r - \theta_s \quad (1)$$

The purpose of the controller, in general, is to take the error feedback $\theta_e$ and the tachometer feedback $\dot{\theta}_s$ to form the control signal $e_s$ which will continuously cause the hydraulic motor to produce the proper angular position $\theta_m$. Specific embodiments of this controller will be discussed hereinbelow. The control signal $e_s$ is amplified in a power amplifier to form the signal $e_g$, which is a high voltage, high current signal capable of driving the servo valve. The fluid flow $q_L$ through the servo valve drives the hydraulic motor which has a response $\theta_m$.

The operation of the power amplifier, the servo valve, the hydraulic motor, the tachometer, and the position servo are well known in the art.

Figure 2:
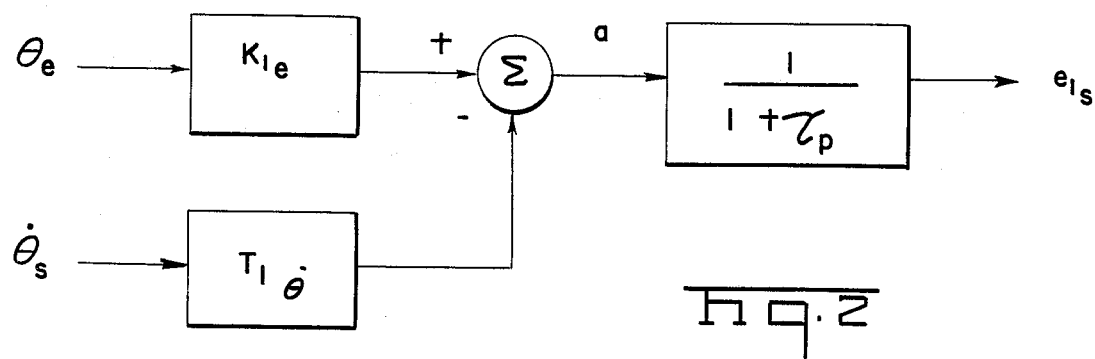
FIG. 2 is a block diagram of a lag-compensation controller.

In accordance with the prior art, the controller of FIG. 1 would be represented by a conventional lag-compensation controller as set forth in FIG. 2. The controller of FIG. 2 is represented by the following equations:

$$a = K_{1_e} \theta_e - T_{1_{\dot\theta}} \dot{A}_s \quad (2)$$

$$\theta_{1_s} = a \left( \frac{1}{1 + \tau s} \right) \quad (3)$$

The coefficient $K_{1_e}$, $T_{1_{\dot\theta}}$ and $\tau$ of the conventional controller are chosen in well known manner as described in the textbook *Hydraulic Control Systems* by Herbert E. Merritt, Wiley, 1967. The conventional control system above gives rise to a pole and zero in the left half plane of the S-plane when analyzing the system by the root-locus method. As stated above, this controller has certain inherent liabilities which it is desired to overcome in accordance with the following embodiments of a controller which will now be described.

Figure 3:
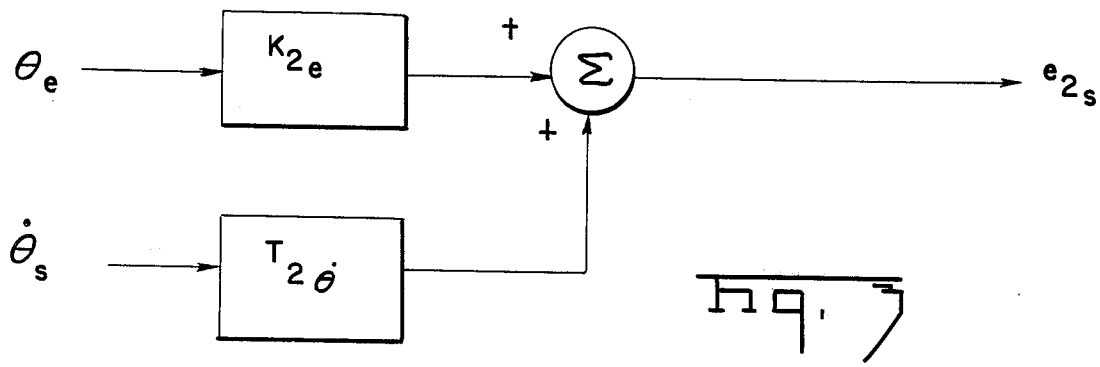
FIG. 3 is a block diagram of a pure non-minimum phase linear controller in accordance with the present invention.

Referring now to FIG. 3, there is shown a pure non-minimum phase linear controller in accordance with the present invention. The equation of the embodiment of FIG. 3 is as follows:

$$e_{2_s} = K_{2_e} \theta_e + T_{2_{\dot\theta}} \dot\theta_s \qquad (4)$$

—Equation 4 represents a controller zero in the right half plane of the S-plane when analyzing the system by the root-locus method.

In accordance with this embodiment, the hydraulic motor angular rate feedback $\dot\theta_s$ is positive. This positive feedback gives rise to the non-minimum phase character of the controller. The angular rate signal $\dot\theta_s$ is multiplied by the positive constant $T_{2_{\dot\theta}}$. The angular error signal $\theta_e$ is multiplied by the positive constant $K_{2_e}$. These products are added in a summer to provide the control signal output $e_{2_s}$ of the controller. The specific values of the constants $K_{2_e}$ and $T_{1_{\dot\theta}}$ which yield optimum system response may be determined through standard root locus analysis.

Referring now to FIG. 4, there is shown a second embodiment of the invention where both the conventional linear controller and the pure non-minimum phase linear controller are combined in the manner shown to provide even better results than in the embodiment of FIG. 3. The equation for the embodiment of FIG. 4 is as follows:

$$e_{3_s} = G_1 e_{1_s} + G_2 e_{2_s} \qquad (5)$$

where $e_{1_s}$ and $e_{2_s}$ are defined from Equations 3 and 4 and where $G_1$ and $G_2$ are positive constants. The combination of the lag-compensation controller and a non-minimum phase linear controller yields the fast rise time achievable with non-minimum phase linear controllers and the steady-state stiffness of the lag-compensation controller. Steady-state stiffness is desirable for good surface finish quality and resistance to load torque disturbances, such as would be caused by friction or by variable loads within the cutting process. The fast rise times are desirable for efficient production. The no-overshoot characteristic, achievable because of the non-minimum phase characteristic of the combined controller, is desirable so that no excess metal is cut off in the cutting process.

Referring now to the embodiments of FIGS. 3 and 4, the values of the constants $K_{2_e}$, $T_{2_{\dot\theta}}$ of FIG. 3 and $K_{1_e}$, $T_{1_\theta}$, $K_{2_e}$, $T_{2_{\dot\theta}}$, $\tau_1$ $G_1$ and $G_2$ of FIG. 4 may be determined by well known linear techniques such as root locus and Bode analyses.

With reference to FIG. 4, though the embodiment is a combination of the lag-compensation controller of FIG. 2 and a pure non-minimum phase linear controller of FIG. 3, the coefficients are not necessarily the same as would be used in a single lag-compensation controller alone or a pure non-minimum phase linear controller alone. Given the characteristics of the structure of the controller as set forth in FIG. 4, the optimum coefficients may be determined according to well known linear analysis techniques. With the controller of FIG. 4, where the prior art controller and a controller in accordance with the present invention are combined to form a single controller, the right half plane zero in the S-plane continues to be present for the combined system when analyzing the system by the root-locus method.

The weight settings for the two controller gains, $G_1$ and $G_2$, are determined primarily by the balance of steady-state stiffness aand of fast rise time desired in the particular application. For example, if the steady-state stiffness is far more important than is the fast rise time, the gain on the conventional linear controller, by comparison to the gain of the non-minimum phase linear controller, would be higher. On the other hand, if one desires very fast rise times and does not require extreme steady-state stiffness, one would use higher gain on the non-minimum phase linear controller as compared with the conventional linear controller.

Figure 5A:
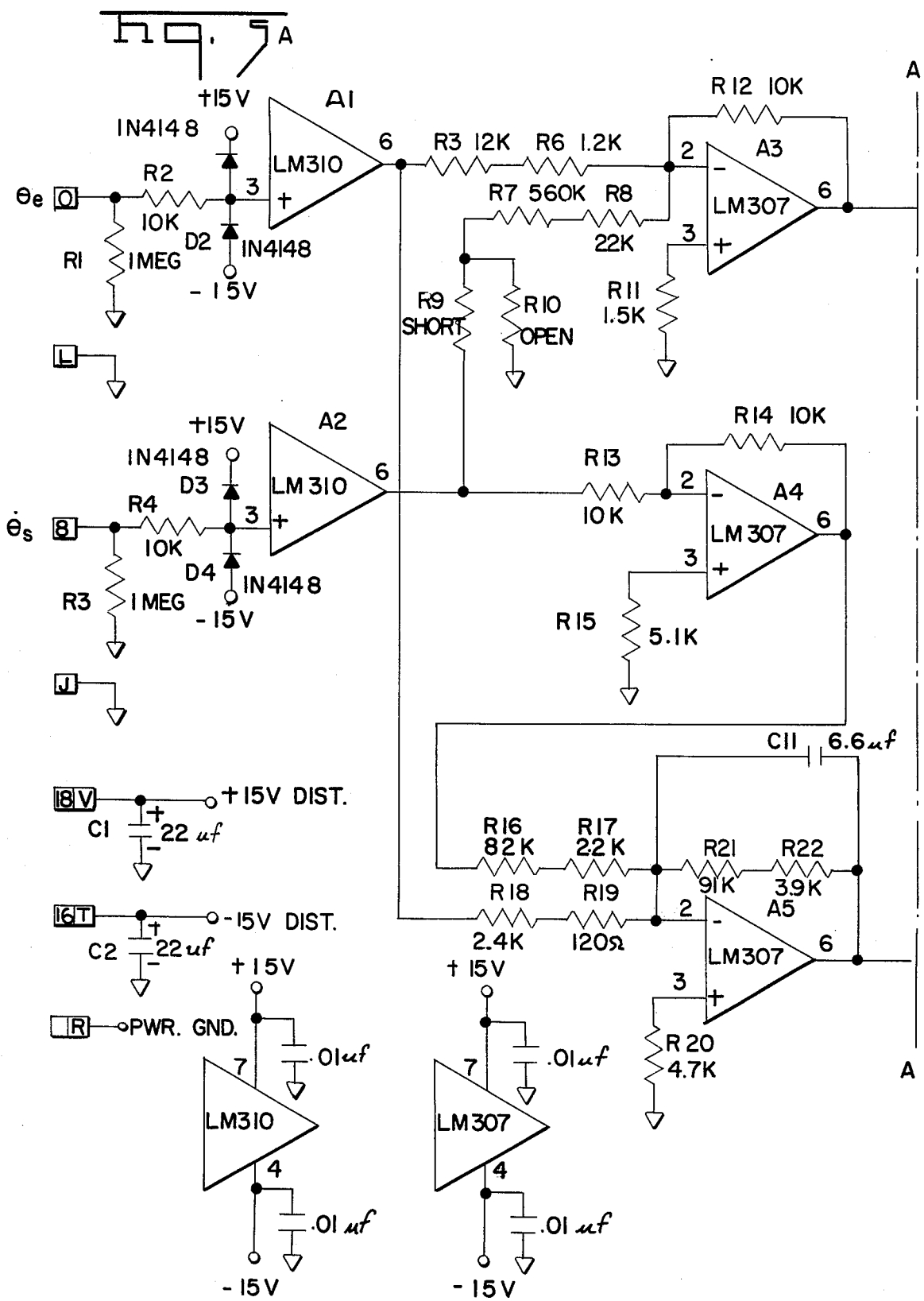
FIG. 5 is a circuit diagram of an embodiment according to FIG. 4.
Figure 5B:
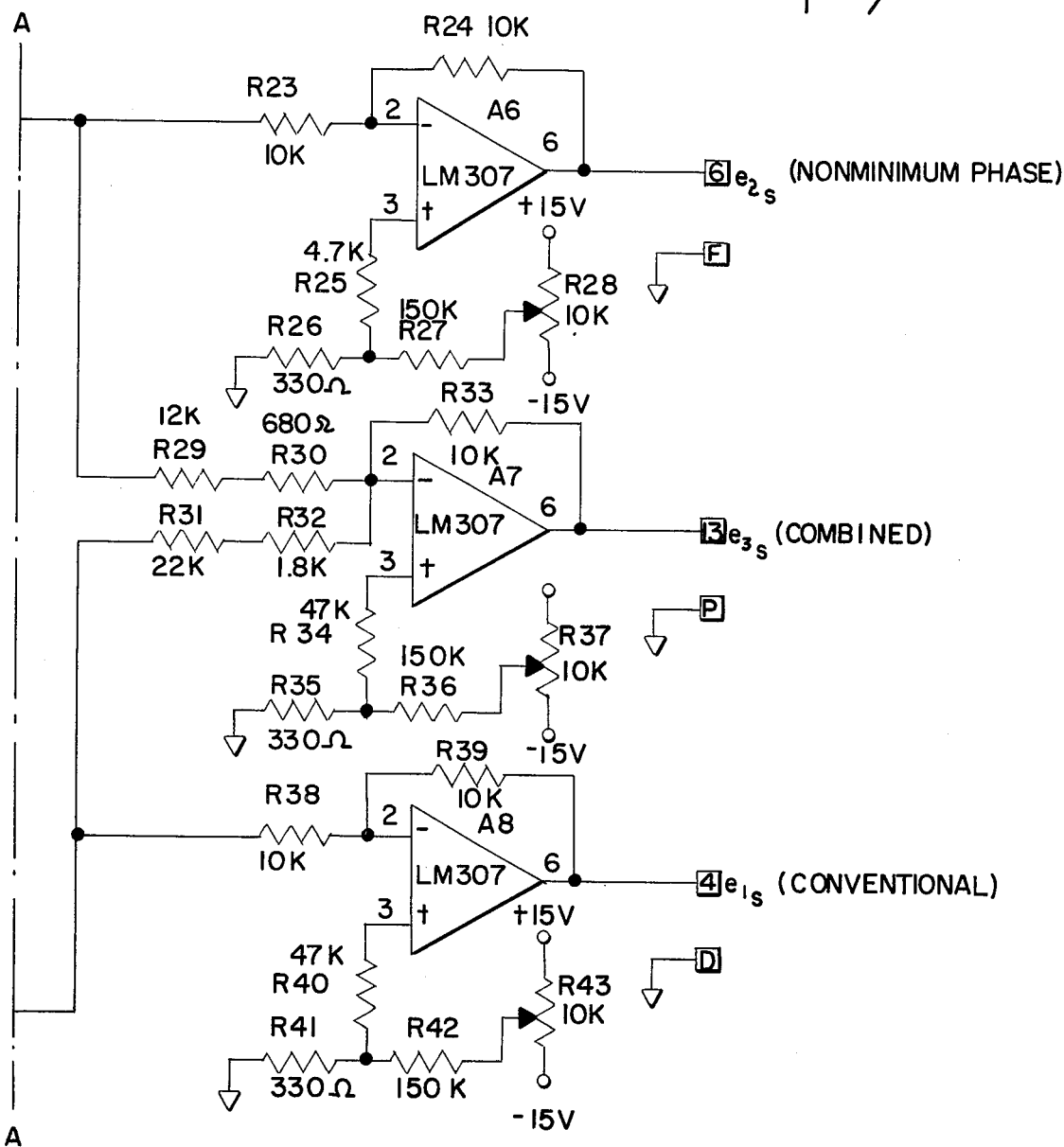

Referring now to FIG. 5, there is shown a circuit diagram of the embodiment of FIG. 4 with values of the circuit included therein.

Though the above description deals primarily with the application of the non-minimum phase linear controller to hydraulic servomechanisms, the controller may be used to advantage with any plant which has the same predominant dynamic characteristics as hydraulic servomechanisms. The predominant plant characteristic, for which the non-minimum phase linear controller is applicable, may be expressed by the Laplace transformation $$\frac{\theta_s}{e_g} = \frac{K}{s(s^2 + 2\delta\omega_n s + \omega_n^2)}$$

where K, $\delta$, and $\Psi_n$ are plant parameters which are either constant or vary only a small amount around their nominal values, and where s is the Laplace operator.

Though the invention is described with respect to specific referred embodiments thereof, many variations and modifications thereof will immediately become apparent to those skilled in the art. It is therefore the intention that the appended claims be interpreted as broadly as possible in view of the prior art to include all such variations and modifications.

What is claimed is:

1. A control system employing positive rate feedback for controlling a plant where the positive feedback is indicated by a right half plane zero of the S-plane in a root-locus system analysis, wherein the predominant plant characteristics are described by a transfer function of the form $$\frac{K}{s(s^2 + 2\delta\omega_n s + \omega_n^2)}$$

where K, $\delta$, and $\omega_n$ are either constant or vary only a small amount around nominal values, and where $s$ is the Laplace operator, comprising
   a. means responsive to command plant response minus measured plant response to provide a plant error signal,
   b. means for providing a plant rate response signal, and
   c. control means for controlling said plant, said control means comprising:
   d. means responsive to said plant error signal to provide a signal indicative thereof multiplied by a positive constant,
   e. means responsive to said plant rate response signal to provide a signal indicative thereof multiplied by a positive constant, and
   f. means for summing the signal provided in (d) plus the signal provided in (e) to provide a control signal for said plant said plus defining a zero in the right half portion of the S-plane when analyzing the system by the root-locus method.

2. A control system as set forth in claim 1, futher including:

a. a second control means providing a second control signal for said plant,
b. means for multiplying said control signal and said second control signal by constants to provide a weighted control signal and a second weighted control signal, and
c. means for summing said weighted control signal and said second weighted control signal to provide a total control signal to said plant.

3. A control system as set forth in claim 1 wherein the plant to be controlled is a servo-valve actuated hydraulic motor, wherein the plant response is measured by a position synchromechanism, and wherein the plant rate response is measured by a tachometer.

4. A control system as set forth in claim 2 wherein the plant to be controlled is a servo-valve actuated hydraulic motor, wherein the plant response is measured by a synchromechanism, and wherein the plant rate response is measured by a tachometer.

* * * * *